(12) United States Patent
Fukushima et al.

(10) Patent No.: US 6,318,246 B2
(45) Date of Patent: Nov. 20, 2001

(54) STEAM GENERATING MECHANISM IN A COOKING OVEN

(75) Inventors: Kei Fukushima; Hiroshi Matsuo, both of Tsurugashima (JP)

(73) Assignee: Fujimak Corporation, Tokyo (JP)

( * ) Notice: Subject to any disclaimer, the term of this patent is extended or adjusted under 35 U.S.C. 154(b) by 0 days.

(21) Appl. No.: 09/833,878

(22) Filed: Apr. 12, 2001

(30) Foreign Application Priority Data

Apr. 20, 2000 (JP) .................................................. 12-119072

(51) Int. Cl.[7] .................. A23L 1/00; A23L 3/04; A47J 27/04; A21B 1/08; H05B 6/64
(52) U.S. Cl. .................. 99/330; 99/331; 99/467; 99/476; 99/451; 99/DIG. 14; 126/20; 126/348; 126/369; 219/401; 219/601; 219/622; 219/680; 219/682; 219/731
(58) Field of Search .................. 99/326–333, 339, 99/340, 467, 473–476, 481, 451, DIG. 14; 126/20, 348, 369, 369.1, 369.2, 369.3; 219/400, 401, 601, 622, 680, 682, 731; 426/241, 248, 243, 523

(56) References Cited

U.S. PATENT DOCUMENTS

| | | | |
|---|---|---|---|
| 5,103,800 | * | 4/1992 | Bedford et al. .................. 126/20 |
| 5,158,064 | * | 10/1992 | Willis et al. .................. 219/401 X |
| 5,401,940 | * | 3/1995 | Smith et al. .................. 99/475 X |
| 5,441,034 | * | 8/1995 | Bedford et al. .................. 99/330 X |
| 5,517,980 | * | 5/1996 | Cappello et al. .................. 99/468 X |
| 5,525,782 | * | 6/1996 | Yoneno et al. .................. 99/451 X |
| 5,619,983 | * | 4/1997 | Smith .................. 99/331 X |
| 5,665,259 | * | 9/1997 | Westerberg .................. 426/523 X |
| 5,676,044 | * | 10/1997 | Lara, Jr. .................. 99/330 |
| 5,680,810 | * | 10/1997 | Sham .................. 99/330 |
| 5,694,835 | * | 12/1997 | Mangina .................. 99/330 X |
| 5,865,108 | * | 2/1999 | Montagnino et al. .................. 99/476 |
| 6,040,564 | * | 3/2000 | Ueda et al. .................. 219/682 |

* cited by examiner

Primary Examiner—Timothy F. Simone
(74) Attorney, Agent, or Firm—Frishauf, Holtz, Goodman, Langer & Chick, P.C.

(57) ABSTRACT

Disclosed is a steam generating mechanism in a cooking oven equipped with a heater and a fan for blowing a hot air into a chamber of the oven, said steam generating mechanism further comprising: a water-supply receiver guide attached integrally to a fan guard which is detachably mounted in the front face side of said fan; and a water-supply unit for supplying water to the water-supply receiver guide when the need arises, wherein the water supplied into the water-supply receiver guide is guided toward the suction side of the fan, sucked by the fan together with the air inside the chamber, and dispersed toward the heater, so that the water may be heated by the heater to be formed into steam, which is then blown into the chamber of the oven.

14 Claims, 7 Drawing Sheets

STEAM GENERATING MECHANISM IN A COOKING OVEN

FIELD OF THE INVENTION

The present invention relates to a steam generating mechanism in a cooking oven, such as a microwave oven, a microwave heating oven or the like.

DESCRIPTION OF THE PRIOR ART

When variety kinds of foods are respectively cooked in a cooking oven such as a microwave oven, a microwave heating oven or the like, it sometimes more preferable for particular kinds of foods to be cooked with a moistening process using a steam heating as well as a regular heating process. Accordingly, many of the conventional ovens have been equipped with a steam generating mechanism in addition to a regular heating means. Conventionally there has been introduced a wide variety of steam generating mechanisms into a market, which are roughly categorized into three types.

A first type of steam generating mechanism employs such configuration as schematically shown in FIG. 10 of the accompanying drawings, in which a steam generator 4 is arranged outside an oven including a fan 2 and an oven heater 3 installed in a chamber 1 thereof. The steam generator 4 is coupled to the oven, so that the steam generated by heating the water with a heater 5 disposed in the water may be introduce into the chamber 1.

A second type of steam generating mechanism employs such configuration as schematically shown in FIG. 11, in which the water 6 is supplied into the bottom portion of an oven including a fan 2 and an oven heater 3 installed in a chamber 1 thereof, and the water 6 is heated by the heater 7 so as to generate the steam into the chamber 1 of the oven.

A third type of steam generating mechanism employs a configuration in which the water is injected over an oven heater to generate the steam, and there have been some exemplary configurations including: one configuration as schematically shown in FIG. 12, in which a water nozzle 8 is laid in the bottom portion of an oven provided with a fan 2 and an oven heater 3 installed in a chamber 1 thereof, so that the water is injected toward the oven heater 3 from this nozzle 8 to generate the steam within the chamber 1; and an alternative configuration as schematically shown in FIG. 13, in which a water-supply pipe 9 is laid in an oven provided with a fan 2 and an oven heater 3 installed in a chamber 1 thereof, said water pipe 9 extending from a ceiling portion to a suction side of the fan 2, so that the water is injected from the water-supply pipe 9 against the fan 2 so as to be dispersed toward the oven heater 3, where the water is heated to be vaporized, thus causing the steam to be introduced into the chamber 1.

However, in the configuration described with reference to FIG. 10 where the separate steam generator is arranged outside the oven, since a tank, a water-supply-and-drain device, a water level controller, a heater or the like are additionally required for said steam generator, a man-hour for manufacturing them is necessarily increased resulting in cost increase. Besides, increased number of components means that a possibility of failures is greater and troubles are more likely to occur by the affection of water quality or the like.

In the configuration described with reference to FIG. 11 where the water is stored in the bottom portion of the oven, in order to generate the steam, another heater other than the oven heater as well as a water level controller are necessary, which also results in cost increase.

In the configuration described with reference to FIG. 12 where the water nozzle is laid in the bottom portion of the oven, the water is only injected over a part of the oven heater, which makes it difficult to generate a sufficient amount of steam.

In the configuration described with reference to FIG. 13 where the water-supply pipe is laid in the oven so as to extend from the ceiling portion to the suction side of the fan, since the water-supply pipe fixedly extends in the front face sides of the oven heater and the fan, it is difficult to clean the fan, heater or the like, which might cause a trouble in the maintenance.

Accordingly, an object of the present invention is to provide a steam generating mechanism in a cooking oven, which can solve the problems of the prior art described above.

SUMMARY OF THE INVENTION

According to an aspect of the present invention, there is provided a steam generating mechanism in a cooking oven equipped with a heater and a fan for blowing a hot air into a chamber thereof, said steam generating mechanism further comprising: a water-supply receiver guide attached integrally to a fan guard which is detachably mounted in the front face side of said fan; and a water-supply unit for supplying water to said water-supply receiver guide when the need arises; wherein the water supplied into said water-supply receiver guide is guided toward a suction side of said fan, sucked by said fan together with the air inside the chamber, and dispersed toward said heater, so that said water may be heated by said heater to be formed into steam, which is then blown into the chamber of the oven.

According to another aspect of the present invention, there is provided a steam generating mechanism in a cooking oven equipped with a heater and a fan for blowing a hot air into a chamber thereof, said steam generating mechanism further comprising: a water-supply receiver guide attached integrally to a fan guard which is detachably mounted in the front face side of said fan; a water-supply unit for supplying water to said water-supply receiver guide; and an automatic controller for actuating said water-supply unit in response to a command for performing a quick cooling of an inside of the chamber, so as to supply water into said water-supply receiver guide; wherein the water supplied into said water-supply receiver guide is guided toward a suction side of said fan, sucked by said fan together with the air inside the chamber, and dispersed toward said heater, so that said water may be heated by said heater to be formed into steam, which is then blown into the chamber of the oven to perform the quick cooling operation in the chamber.

According to still another aspect of the present invention, there is provided a steam generating mechanism in a cooking oven equipped with a heater and a fan for blowing a hot air into a chamber thereof, said steam generating mechanism comprising: a water-supply receiver guide attached integrally to a fan guard which is detachably mounted in the front face side of said fan; a water-supply unit for supplying water to said water-supply receiver guide; and an automatic controller for actuating said water-supply unit in response to a command for washing an inside of the chamber, so as to supply water into said water-supply receiver guide; wherein the water supplied into said water-supply receiver guide is guided toward a suction side of said fan, sucked by said fan together with the air inside the chamber, and dispersed toward said heater, so that said water may be heated by said heater to be formed into steam, which is blown into the chamber of the oven to enhance a washing operation in the chamber.

According to an embodiment of the present invention, said water-supply receiver guide is a water-supply guide pipe which guides the water supplied from said water-supply unit directly to the suction side of said fan.

According to another embodiment of the present invention, said water-supply receiver guide is a water receiver which guides the water supplied from said water-supply unit to the suction side of said fan by causing the water to flow along said fan guard.

According to still another embodiment of the present invention, said fan guard also serves as a grease filter.

DESCRIPTION OF THE PREFERRED EMBODIMENTS

The present invention will now be described in detail with respect to embodiments thereof in conjunction with FIGS. 1 through 9.

Figure 1:
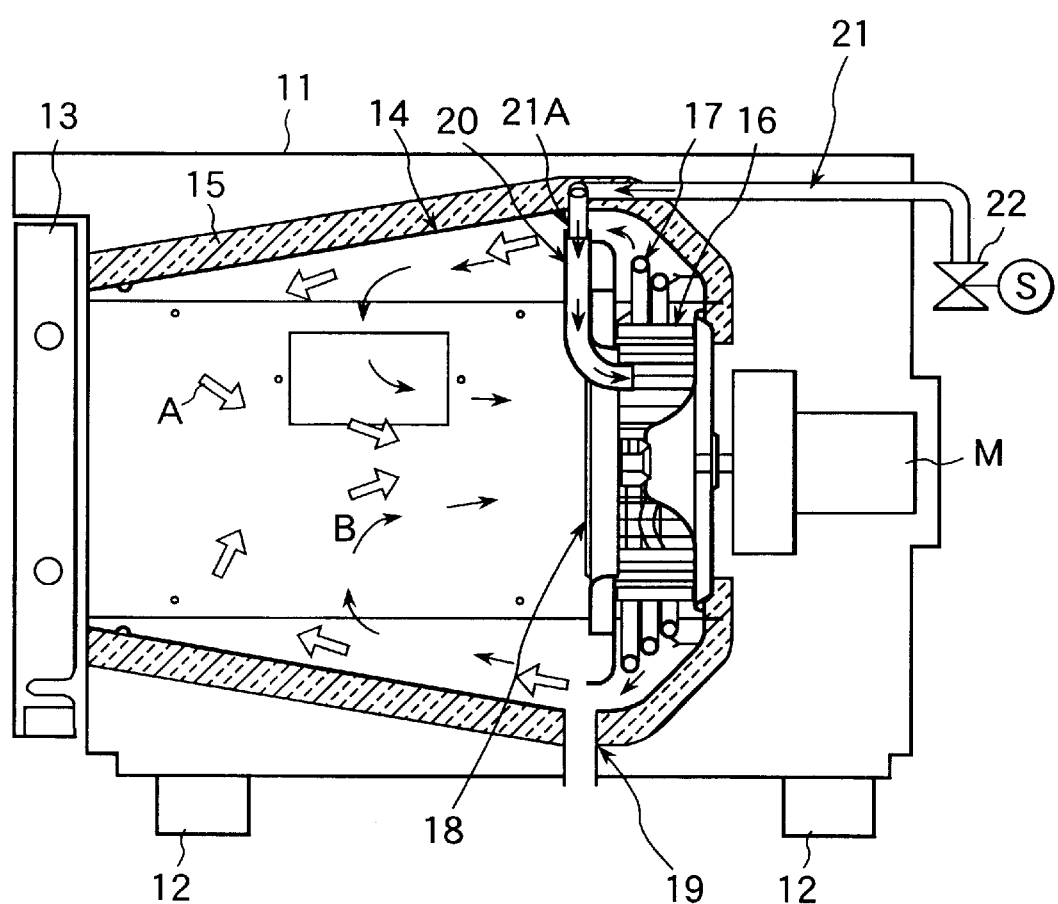
FIG. 1 is a schematic cross sectional view, illustrating a cooking oven equipped with a steam generating mechanism of a first embodiment according to the present invention.

FIG. 1 is a schematic cross sectional view, illustrating a cooking oven equipped with a steam generating mechanism of an embodiment according to the present invention. As shown in FIG. 1, the cooking oven has an exterior housing 11 with legs 12 respectively attached to each of four corners of the bottom portion of the exterior housing 11. A door 13 is installed on a front face side of the exterior housing 11 to expose or close an opening through which foods are inserted into or taken out of a chamber of the oven. The chamber of this oven is defined by said door 13 and an oven inner wall 14 arranged in an inner side of said exterior housing 11. A heat insulating material 15 is mounted on an outer side of the oven inner wall 14. Further, a fan 16 for performing a forced convection is disposed on the back face side of the chamber, and a heater 17 such as a sheathed heater is arranged surroundings the fan 16. Still further, a fan guard 18 is detachably disposed in the front face side of the fan 16.

The fan 16 is rotationally driven by a motor M, and has its front face side, where the fan guard is located, defined as an air suction side, and its Peripheral Portion, where the heater 17 is located, defined as an air blowing side.

Accordingly, during the fan 16 is under operation, the air within the chamber is sucked through the fan guard 18 and blown back into the chamber from the surrounding portion of the fan 16 passing through the electric heater 17. At that time, the air is heated by the electric heater 17 to be hot air, which is to be circulated within the chamber. Such airflow is indicated with the arrow A in FIG. 1. It is to be noticed that those parts, such as a turntable or the like, which are supposed to be typically arranged in the chamber are illustratively omitted in FIG. 1.

The cooking oven with the configuration as described above is equipped with a steam generating mechanism according to the present invention, comprising a water-supply guide pipe 20 arranged so as to be integrated with the fan guard 18, and a water-supply pipe 21 as a water-supply unit for supplying the water into said water-supply guide pipe 20 when the need arises, said water-supply pipe 21 being arranged so as to extend through the oven inner wall 14 and the heat insulating material 15 to be drawn to an outside of the exterior housing 11. As schematically shown in FIG. 1, one end of the water-supply pipe 21 is disposed as a water-supply port 21A in such a position where it is allowed to be inserted a little into an upper end of said water-supply guide pipe 20 integrated with the fan guard 18, while the other end of the water-supply pipe 21 is adapted to be coupled with an appropriate water-supply source (not shown) via an electromagnetic valve 22. On the other hand, the lower end of the water-supply guide pipe 20 has a curvature so as to be open into the air suction side of the fan 16.

Figure 2:
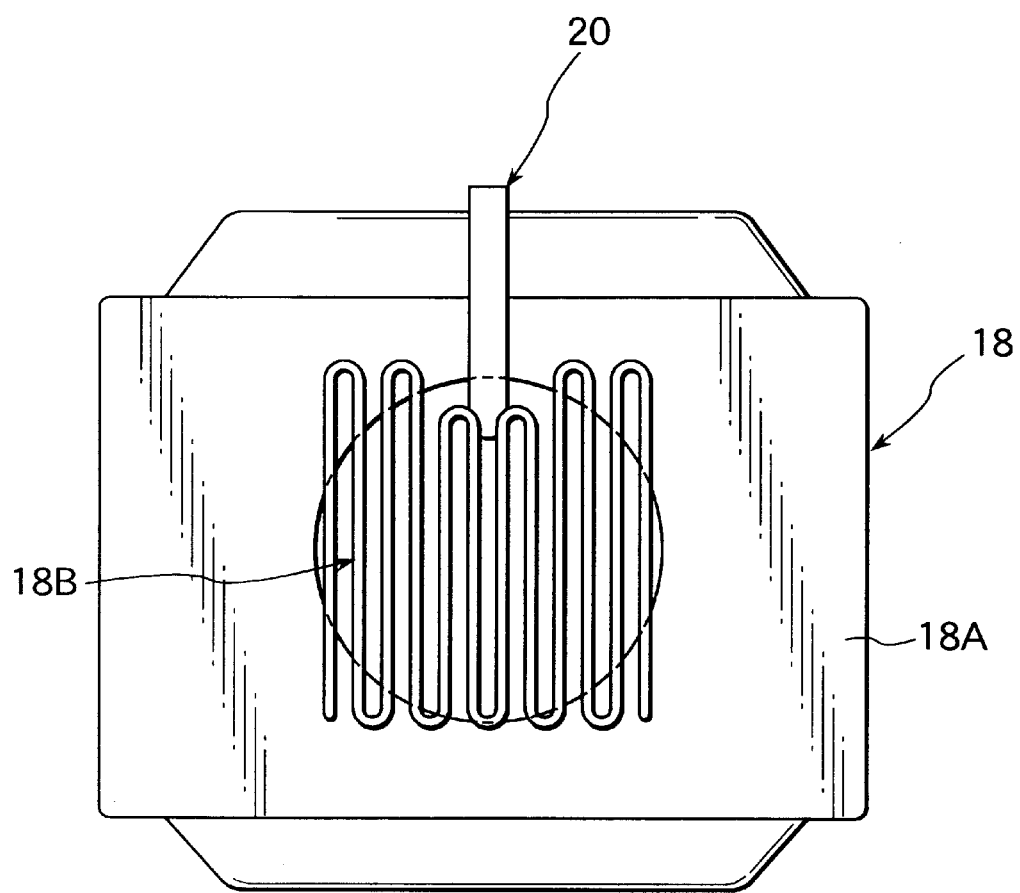
FIG. 2 is a front elevational view of a fan guard with a water-supply guide pipe attached integrally thereto, of the cooking oven of FIG. 1.
Figure 3:
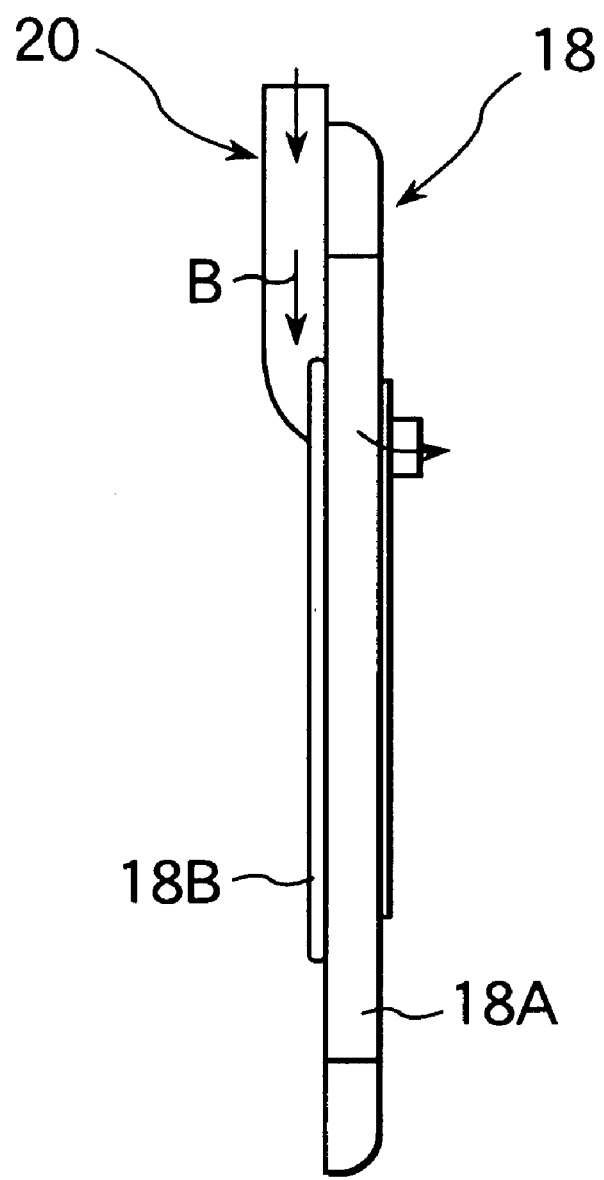
FIG. 3 is a side elevational view of the fan guard of FIG. 2.

FIG. 2 is a front elevational view of the fan guard 18 with the water-supply guide pipe 20 attached integrally thereto, while FIG. 3 is a side elevational view of the fan guard of FIG. 2. As well shown in FIGS. 2 and 3, the fan guard 18 of this embodiment comprises a frame 18A having a circular opening in a location corresponding to the air suction side of the fan 16 and a guard net 18B spanned over said circular opening. On the other hand, the water-supply guide pipe 20 is attached to the frame 18A of the fan guard 18 such that the curved lower end portion thereof enters the circular opening of the frame 18A. Any arbitrary attaching method may be employable for attaching this water-supply guide pipe 20 to the frame 18A, that is, for example, the water-supply guide pipe 20 may be adhered to the frame 18A by an appropriate adhesive or may be fastened the retrial a mechanical engagement member. Further, although in the above description, the water-supply guide pipe 20 is formed as a separate part from the fan guard 18 and then is attached thereto to be integrated into a single unit, the present invention is not limited to this but a water-supply guide pipe and a fan guard may be originally formed as an integrated single unit of both components. What is important is that the water-supply guide pipe and the fan guard should be configured such that, when the fan guard is attached to and/or detached from the chamber, the water-supply guide pipe could be attached and/or detached together with the fan guard.

An entire operation of a cooking oven with the configuration described above will now be explained. When a food is to be cooked using hot air heating and steam heating, primarily it must be checked in due course that the fan guard 18 has been attached in the chamber. If the fan guard 18 has been attached in a proper location, the upper end of the water-supply guide pipe 20 integrated with the fan guard 18 should be located in the position so as to receive the water-supply port 21A of the water-supply pipe 21, and the other end of the water-supply guide pipe 20 should be located in the position so as to be open in the air suction side of the fan 16 as shown in FIG. 1. Then, the door 13 is opened, the food to be cooked is loaded in a proper location, for example, on a turntable (no shown), within the chamber, the door 13 is closed, and the electric heater 17 and the motor M are switched on. Sequentially, the fan 16 is driven to take effect, so that the air in the chamber is guided from the air suction side to the air blowing side and through the electric heater 17 back into the chamber. Such airflow is indicated with the arrow A in FIG. 1. The air is heated by the electric heater 17 to be hot air, which is sprayed over the food, thus the cooking of the food going on by hot air heating.

After a predetermined period, the electromagnetic valve 22 is opened and the water from the water-supply source (not shown) starts to be supplied through the water-supply pipe 21 to the water-supply guide pipe 20. Then the water is guided through the water-supply guide pipe 20 toward the suction side of the fan 16. The water guided to the suction side is, in turn, fed to the blowing side together with the air in the chamber by the suction force of the fan 16 and is dispersed over almost entire area of the heating section of the electric heater 17 extending therein. The water dispersed onto the electric heater 17 is then heated to be formed into steam by the heating section of the electric heater 17, and at the same time the steam is fed into the chamber together with the heated air. In FIGS. 1 and 3, such water and steam flows are indicated with the arrow B. In this way, the steam fed into the chamber is sprayed over the food to bring the steam heating into effect, so that the food could be successfully cooked up with appropriate moistening. It should be understood that the water, which was formerly used for the steam heating and formed back into water in response to the temperature drop through the process, would be discharged outside the oven via a drain port 19 arranged in the bottom portion of the oven.

Figure 4:
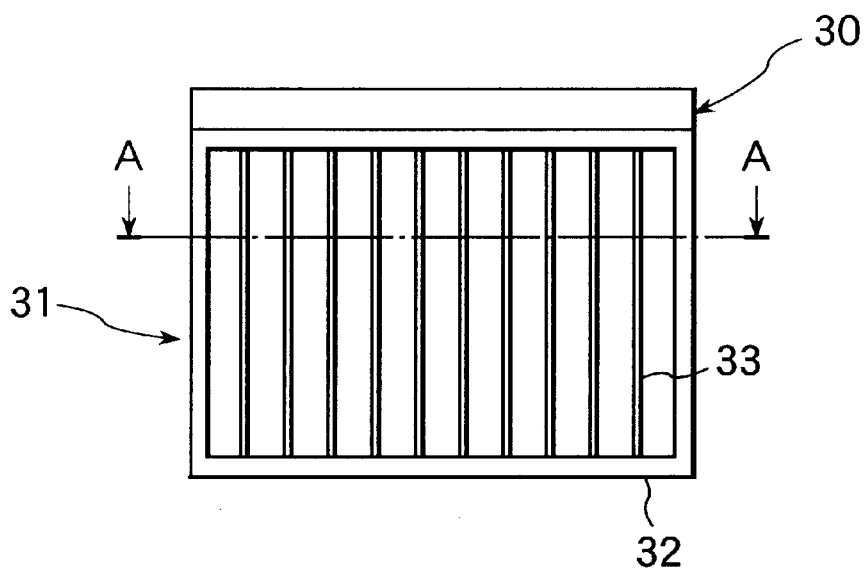
FIG. 4 is similar to FIG. 2, illustrating a steam generating mechanism in a cooking oven according to another embodiment of the present invention.
Figure 5:
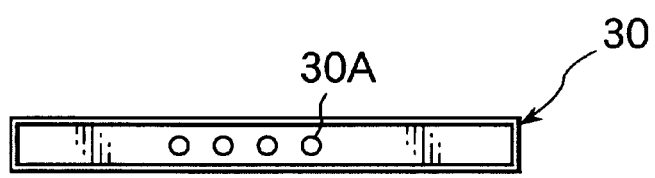
FIG. 5 is a plan view of the fan guard of FIG. 4.
Figure 6:
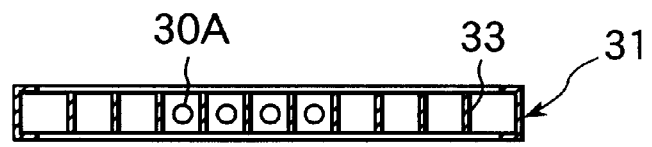
FIG. 6 is a cross sectional view taken on line A—A of FIG. 4.

A steam generating mechanism in the cooking oven of another embodiment according to the present invention will now be described with particular reference to FIGS. 4 to 6. In this alternative embodiment, as shown in FIG. 4, a fan guard 31 having water receiver 30 arranged integrally therewith is provided as a substitute for the fan guard 18 having the water-supply guide pipe 20 arranged integrally in the upper portion thereof as shown in FIG. 2. This fan guard 31 is configured such that a plurality of guard plates 33 is arranged between frames 32 placing a space between respective guard plates and is allowed to be detachably mounted on a predetermined location in the chamber in the same manner as of the fan guard 18. As clearly shown in the plan view of FIG. 5, a plurality of through holes 30A is formed on the bottom portion of the water receiver 30. FIG. 6 is a cross sectional view taken on line A—A of FIG. 4.

To make a brief description of the operation of this alternative embodiment, it should be appreciated that the fan guard 31 of FIG. 4 should be disposed in the position for the fan guard 18 in FIG. 1. Let us assume that after the fan 16 and the electric heater 17 having been switched on to operate, the electromagnetic valve 22 is opened and the water is begun to be supplied through the water-supply pipe 21 into the water receiver 30. The water supplied into the water receiver 30 is guided through the through holes 30A in the bottom portion thereof to the adjacent guard plates 33, and further flows along the guard plates 33 to reach to the suction side of the fan 16. Thus once having reached to the suction side of the fan 16, the water is sucked and fed to the blowing side together with the air in the chamber by the suction force of the fan 16, and then is dispersed over almost entire area of the heating section of the electric heater 17. The dispersed water is heated by the heating section of the electric heater 17 to be formed into steam, which is in turn fed into the chamber of the oven.

Figure 7:
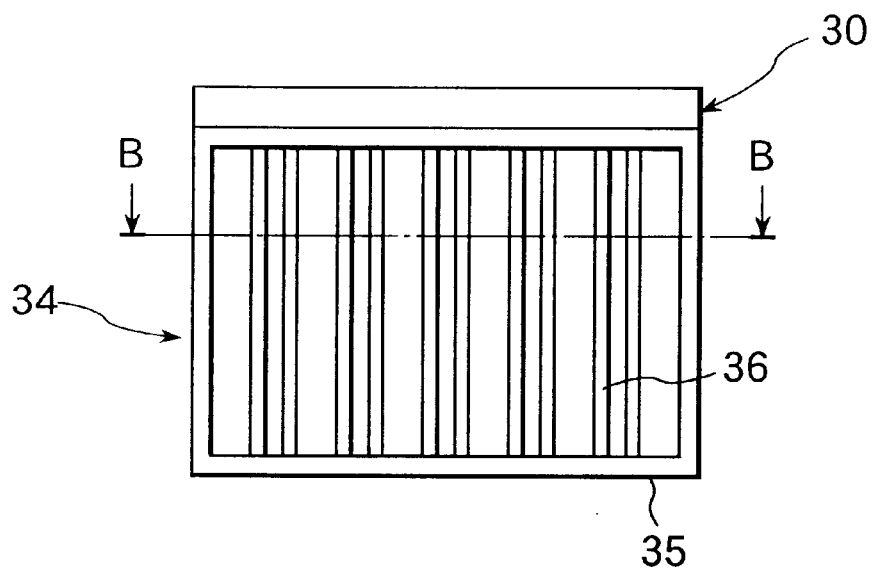
FIG. 7 is similar to FIG. 4, illustrating a steam generating mechanism in a cooking oven according to still another embodiment of the present invention.
Figure 8:
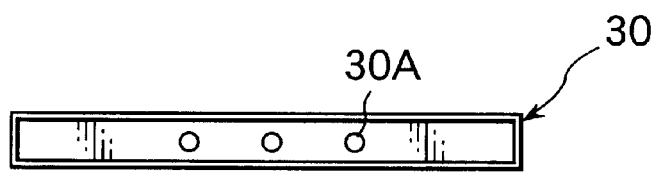
FIG. 8 is a plan view of the fan guard of FIG. 7.
Figure 9:
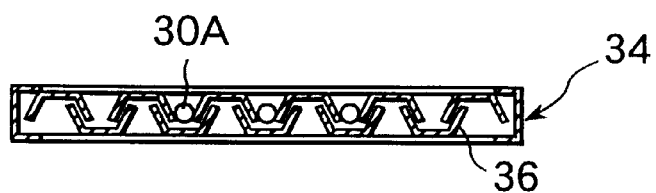
FIG. 9 is a cross sectional view taken on line B—B of FIG. 7.
Figure 10:
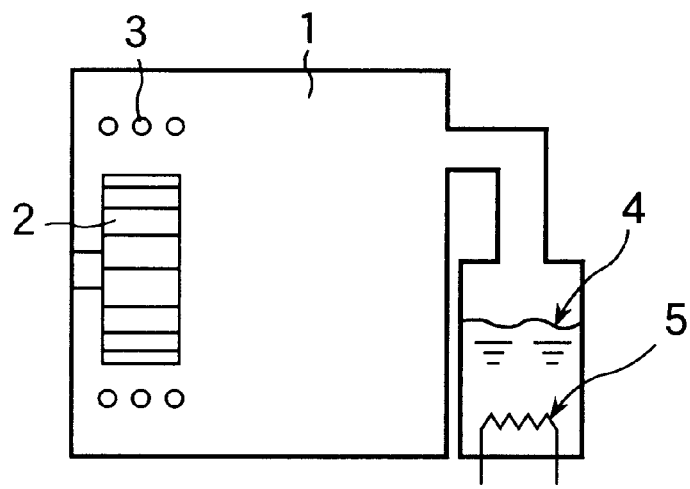
FIG. 10 is a schematic view illustrating an embodiment of a steam generating mechanism of the prior art.
Figure 11:
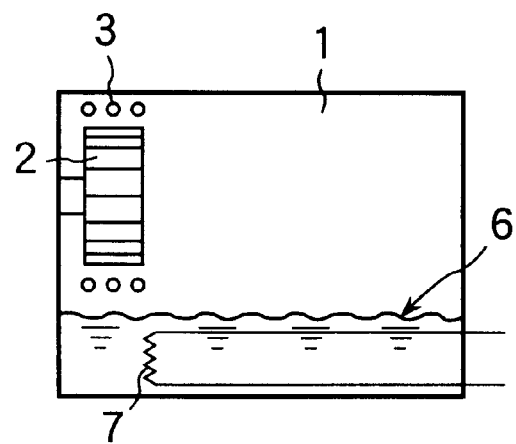
FIG. 11 is a schematic view illustrating another embodiment of a steam generating mechanism of the prior art.
Figure 12:
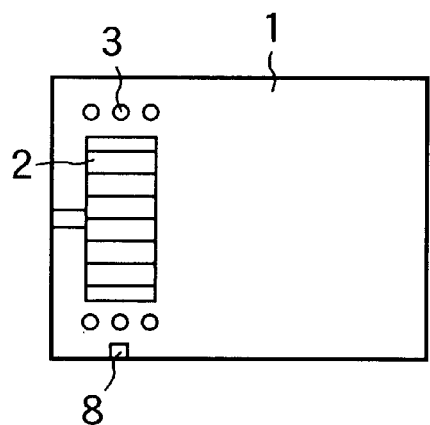
FIG. 12 is a schematic view illustrating still another embodiment of a steam generating mechanism of the prior art.
Figure 13:
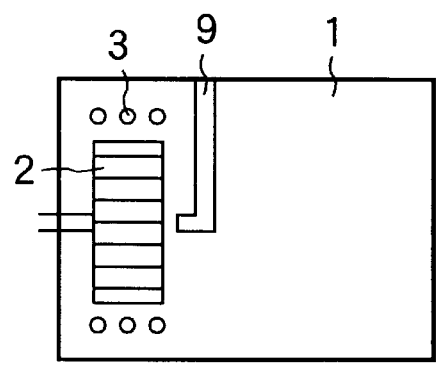
FIG. 13 is a schematic view illustrating yet another embodiment of a steam generating mechanism of the prior art.

FIG. 7 is similar to FIG. 4, illustrating still another embodiment, while FIG. 8 is a plan view of the fan guard of FIG. 7, and FIG. 9 is a cross sectional view taken on line B—B of FIG. 7. In this alternative embodiment, a fan guard 36, which also serves as a grease filter, is provided with a water receiver 30 arranged integrally in the upper portion thereof. Also this fan guard 36 is designed so as to be detachably mounted on a predetermined location in the chamber. The difference from the fan guard shown in FIG. 4 is that a plurality of baffle plates 36 is arranged between the frames 35 placing an appropriately space between respective baffle plates so as to act also as a grease filter.

To make a brief description of the operation of this alternative embodiment, it should be appreciated that the fan guard 34 of FIG. 7 should be disposed in the position for the fan guard 18 in FIG. 1. Let us assume that after the fan 16 and the electric heater 17 having been switched on to operate, the electromagnetic valve 22 is opened and the water is begun to be supplied through the water-supply pipe 21 into the water receiver 30. The water supplied into the water receiver 30 is guided through the through holes 30A in the bottom portion thereof to the adjacent baffle plates 36, and further flows along the baffle plates 36 to reach to the suction side of the fan 16. Thus once having reached to the suction side of the fan 16, the water is sucked and fed to the blowing side together with the air in the chamber by the suction force of the fan 16, and then is dispersed over almost entire area of the heating section of the electric heater 17. The dispersed water is heated by the heating section of the electric heater 17 to be formed into steam, which is in turn fed into the chamber of the oven. This fan guard 34 has a function for filtering oil content, which may be generated inside the chamber during the cooking processes, by the effect of the baffle plates 36 when the oil content is sucked by the fan 16 together with the air in the chamber, as well as a basic function for protecting the fan 16.

In these embodiments described above, a flow path for the supplied water may be differently adjusted by employing the different size, geometry, arrangement or the like of the through holes formed on the bottom portion of the water receiver, the guard plate, the baffle plate or the like, thus allowing for steam yield to be arbitrarily determined.

Although, in the above description of those embodiments, the steam generating mechanism according to the present invention has been explained as a device which is principally used for steam heating process in cooking of foods, the present invention is not limited to this. For example, the steam generating mechanism installed in a cooking oven according to the present invention is effective in generating steam for moistening and heating process upon washing the chamber of the oven with a detergent. In this case, it is suggested that the steam generating mechanism in any of the above-described embodiments should be equipped with a suitable automatic controller for controlling automatically the operation of the electromagnetic valve 22 arranged in the water-supply pipe 21. This automatic controller may be designed to perform the automatic control in such a way that, for example, upon receiving a command for washing the chamber of the oven that is invoked by an appropriate input means, it actuates the electromagnetic valve 22 to supply water to the water-supply receiver guide 20 or 30.

Further, the steam generating mechanism according to the present invention is also effective in generating steam to be used as a cooling means for reducing temperature rapidly within the chamber of the oven, in a case where it is desired to cook a particular food immediately after the cooking of another food, the former being preferably cooked in a temperature lower than the temperature set for the cooking of the latter, or in a case where it is desired to wash the chamber of the oven immediately after the cooking. In this situation, it is suggested that the steam generating mechanism in any of the above-described embodiments should be equipped with a suitable automatic controller for controlling automatically the operation of the electromagnetic valve 22 arranged in the water-supply pipe 21. This automatic controller may be designed to perform the automatic control in such a way that, for example, upon receiving a detection signal representing the completion of a first round of the cooking and a signal representing a quick cooling of the inside of the chamber, it actuates the electromagnetic valve 22 to supply water to the water-supply receiver guide 20 or 30.

Since a steam generating mechanism according to the present invention does not need any particular heat sources or devices for generating steam, a steam generating function could be added to a cooking oven in a simplified manner and at a low cost.

Since a water-supply guide pipe and a water receiver included in a steam generating mechanism are detachable from the chamber of the oven together with a fan guard, this facilitates a cleaning inside the oven chamber as well as a cleaning of a heater, fan or the like.

Further, since water is dispersed entirely over a heater in a steam generating mechanism with a configuration according to the present invention, a sufficient amount of steam could be generated.

What is claimed is:

1. A steam generating mechanism in a cooking oven equipped with a heater and a fan for blowing a hot air into a chamber hereof, said steam generating mechanism characterized in further comprising:
    a water-supply receiver guide attached integrally to a fan guard which is detachably mounted in the front face side of said fan; and
    a water-supply unit for supplying water to said water-supply receiver guide when the need arises;
        wherein the water supplied into said water-supply receiver guide is guided toward a suction side of said fan, sucked by said fan together with the air inside said chamber, and dispersed toward said heater, so that said water may be heated by said heater to be formed into steam, which is then blown into the chamber of the oven.

2. A steam generating mechanism in a cooking oven equipped with a heater and a fan for blowing a hot air into a chamber thereof, said steam generating mechanism characterized in further comprising:
    a water-supply receiver guide attached integrally to a fan guard which is detachably mounted in the front face side of said fan;
    a water-supply unit for supplying water to said water-supply receiver guide; and
    an automatic controller for actuating said water-supply unit in response to a command for performing a quick cooling of an inside of the chamber, so as to supply water into said water-supply receiver guide;
        wherein the water supplied into said water-supply receiver guide is guided toward a suction side of said fan, sucked by said fan together with the air inside said chamber, and dispersed toward said heater, so that said water may be heated by said heater to be formed into steam, which is then blown into said chamber of the oven to perform the quick cooling operation in the chamber.

3. A steam generating mechanism in a cooking oven equipped with a heater and a fan for blowing a hot air into a chamber thereof, said steam generating mechanism characterized in further comprising:
    a water-supply receiver guide attached integrally to a fan guard which is detachably mounted in the front face side of said fan;
    a water-supply unit for supplying water to said water-supply receiver guide; and
    an automatic controller for actuating said water-supply unit in response to a command for washing an inside of said chamber, so as to supply water into said water-supply receiver guide;
        wherein the water supplied into said water-supply receiver guide is guided toward a suction side of said fan, sucked by said fan together with the air inside the chamber, and dispersed toward said heater, so that said water may be heated by said heater to be formed into steam, which is blown into the chamber of the oven to enhance a washing operation in the chamber.

4. A steam generating mechanism in accordance with claim 1, in which said water-supply receiver guide is a water-supply guide pipe which guides the water supplied from said water-supply unit directly to the suction side of said fan.

5. A steam generating mechanism in accordance with claim 1, in which said water-supply receiver guide is a water receiver which guides the water supplied from said water-supply unit to the suction side of said fan by causing the water to flow along said fan guard.

6. A steam generating mechanism in accordance with claim 1, in which said fan guard also serves as a grease filter.

7. A steam generating mechanism in accordance with claim 2, in which said water-supply receiver guide is a water-supply guide pipe which guides the water supplied from said water-supply unit directly to the suction side of said fan.

8. A steam generating mechanism in accordance with claim 3, in which said water-supply receiver guide is a water-supply guide pipe which guides the water supplied from said water-supply unit directly to the suction side of said fan.

9. A steam generating mechanism in accordance with claim 2, in which said water-supply receiver guide is a water receiver which guides the water supplied from said water-supply unit to the suction side of said fan by causing the water to flow along said fan guard.

10. A steam generating mechanism in accordance with claim 3, in which said water-supply receiver guide is a water receiver which guides the water supplied from said water-supply unit to the suction side of said fan by causing the water to flow along said fan guard.

11. A steam generating mechanism in accordance with claim 2, in which said fan guard also serves as a grease filter.

12. A steam generating mechanism in accordance with claim 3, in which said fan guard also serves as a grease filter.

13. A steam generating mechanism in accordance with claim 4, in which said fan guard also serves as a grease filter.

14. A steam generating mechanism in accordance with claim 5, in which said fan guard also serves as a grease filter.

* * * * *